United States Patent [19]

Thorsby et al.

[11] 4,445,643

[45] May 1, 1984

[54] IRRIGATION SYSTEM

[76] Inventors: Grover A. Thorsby, Rte. 1, Box 115; Mark E. Burgess, Rte. 1, Box 82B, both of Madison, Ga. 30650

[21] Appl. No.: 336,690

[22] Filed: Jan. 4, 1982

[51] Int. Cl.³ ............................................. B65H 75/00
[52] U.S. Cl. .................................... 239/197; 239/199; 137/355.2
[58] Field of Search ................ 239/188, 189, 195–199; 280/109, 110, 125–126, 129, 85; 137/355.26, 355.27, 355.16, 355.2

[56] References Cited

U.S. PATENT DOCUMENTS

| 3,043,520 | 7/1962 | Nelson | 239/189 |
| 3,810,579 | 5/1974 | DiPalma | 239/199 X |
| 4,006,860 | 2/1977 | Cornelius | 239/716 X |
| 4,346,843 | 8/1982 | Long et al. | 239/199 |

FOREIGN PATENT DOCUMENTS

| 658504 | 6/1929 | France | 280/110 |
| 2036693 | 2/1980 | United Kingdom | 239/198 |

Primary Examiner—John J. Love
Assistant Examiner—Paul A. Sobel
Attorney, Agent, or Firm—B. J. Powell

[57] ABSTRACT

A reel type irrigation system adapted to be connected to a source of liquid under pressure to distribute the liquid on the ground including a reel unit with a rotatable reel and drive means adapted to rotate the reel in a given direction when the drive means is connected to the source of liquid under pressure; a carriage unit movably supported on the ground with a sprinkling gun adapted to discharge the liquid onto the ground when connected to the liquid source; and a flexible pipe connected to the reel and the carriage unit so that the pipe is wound around the reel to pull the carriage unit over the ground to the reel unit. A control system is provided which senses the ground speed of the carriage unit by sensing the speed of the supply pipe with respect to the reel unit and adjusts the drive means to maintain the ground speed of the carriage unit at a preselected rate.

16 Claims, 17 Drawing Figures

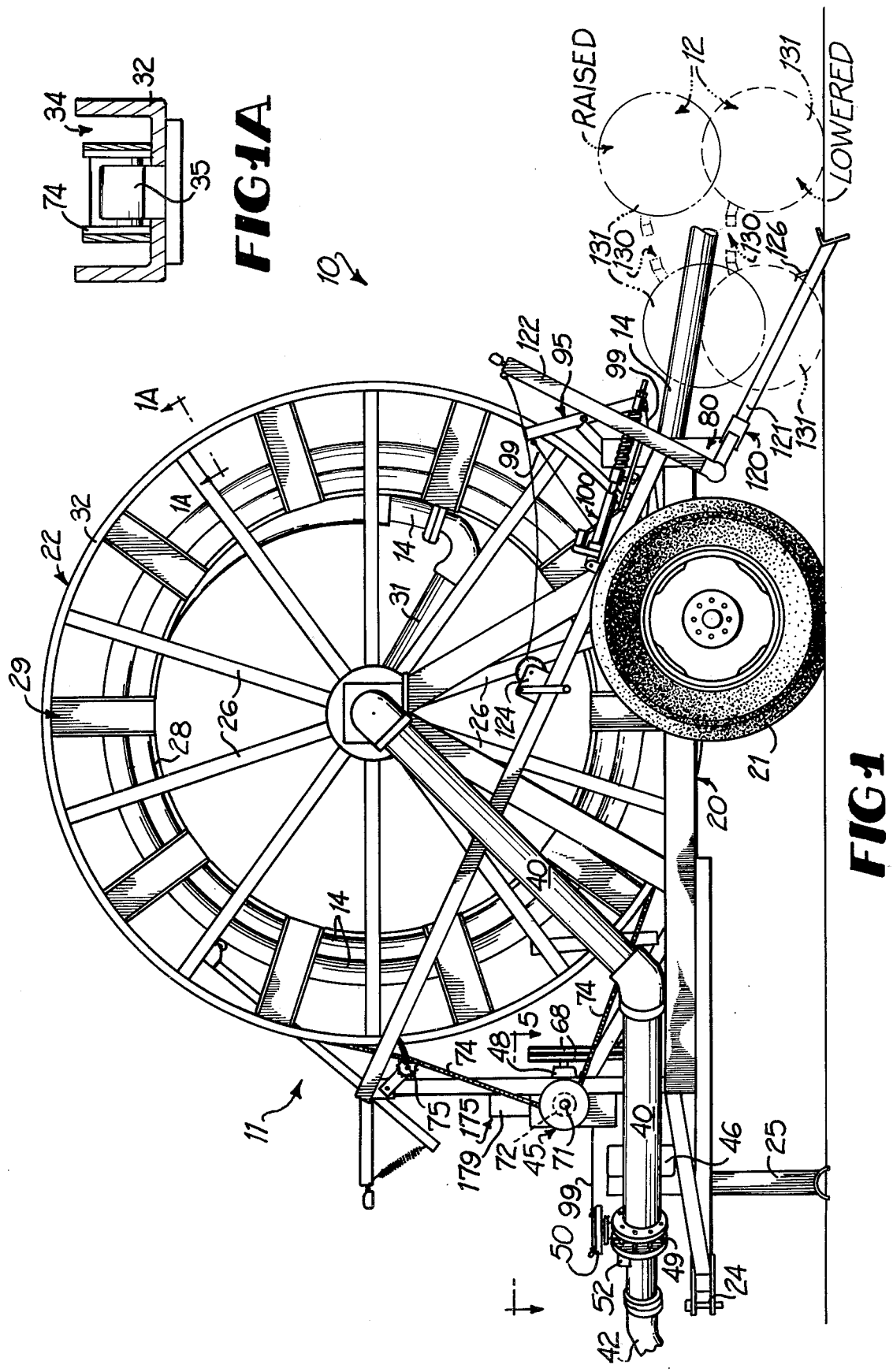

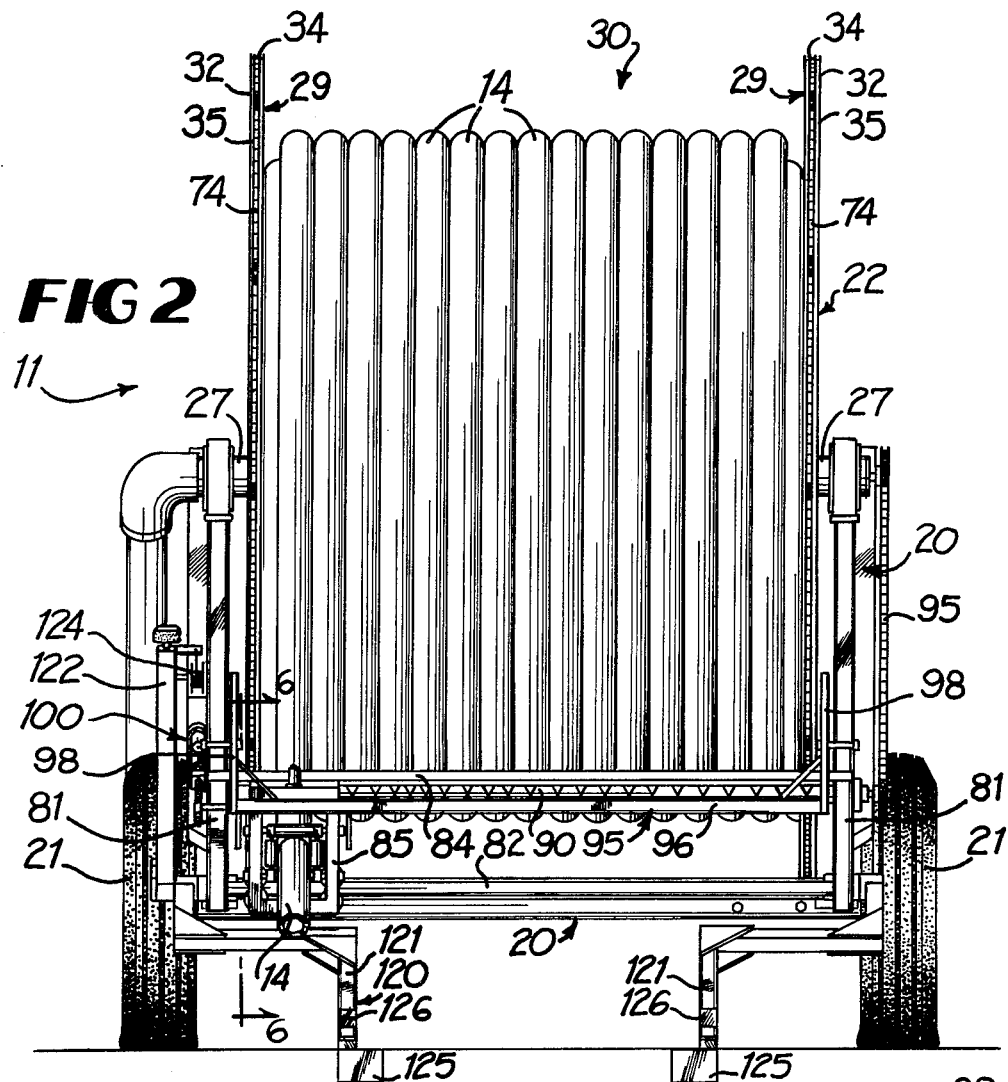
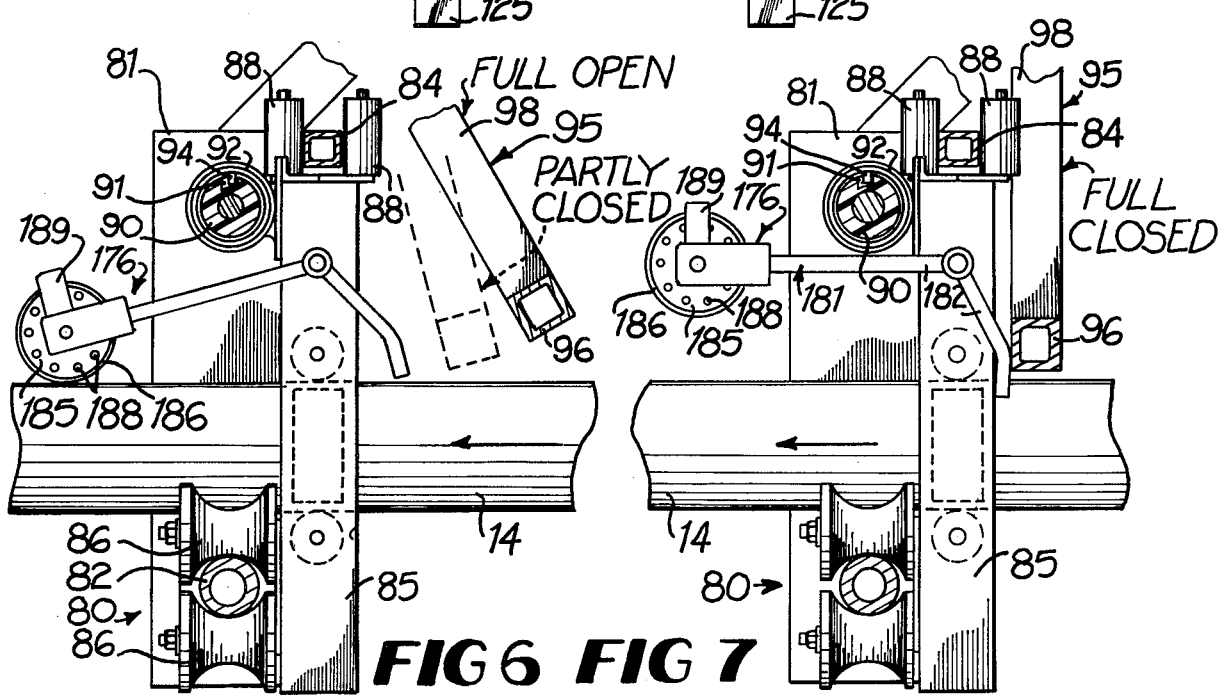

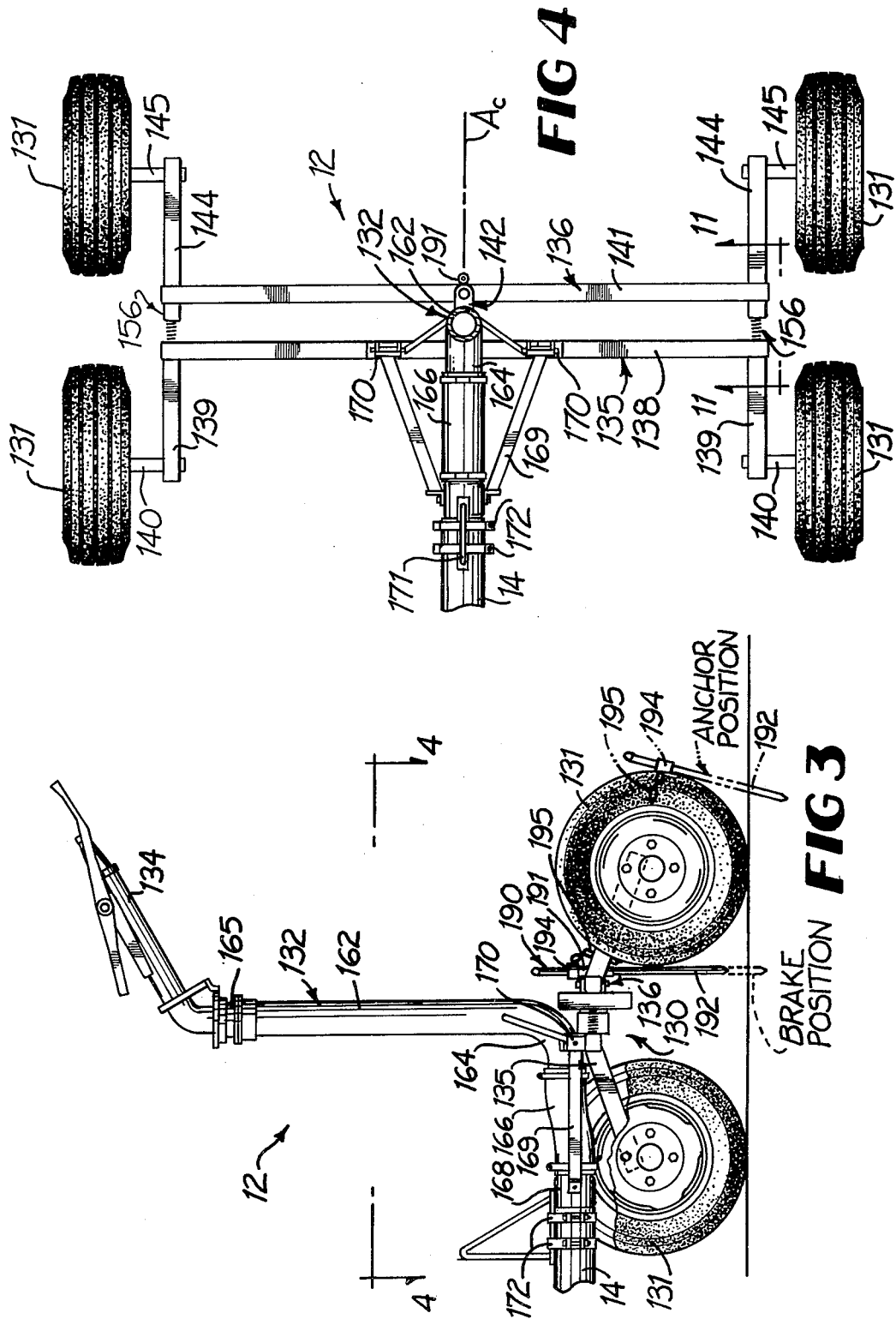

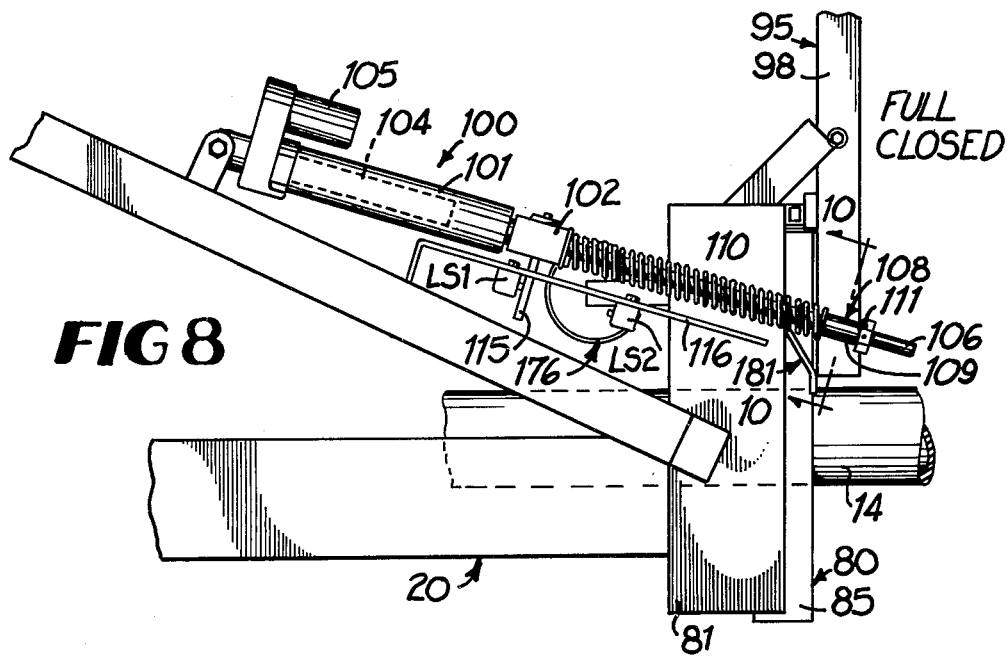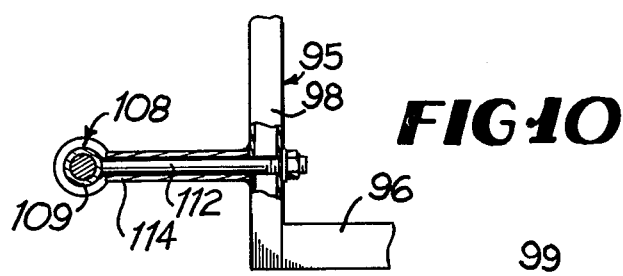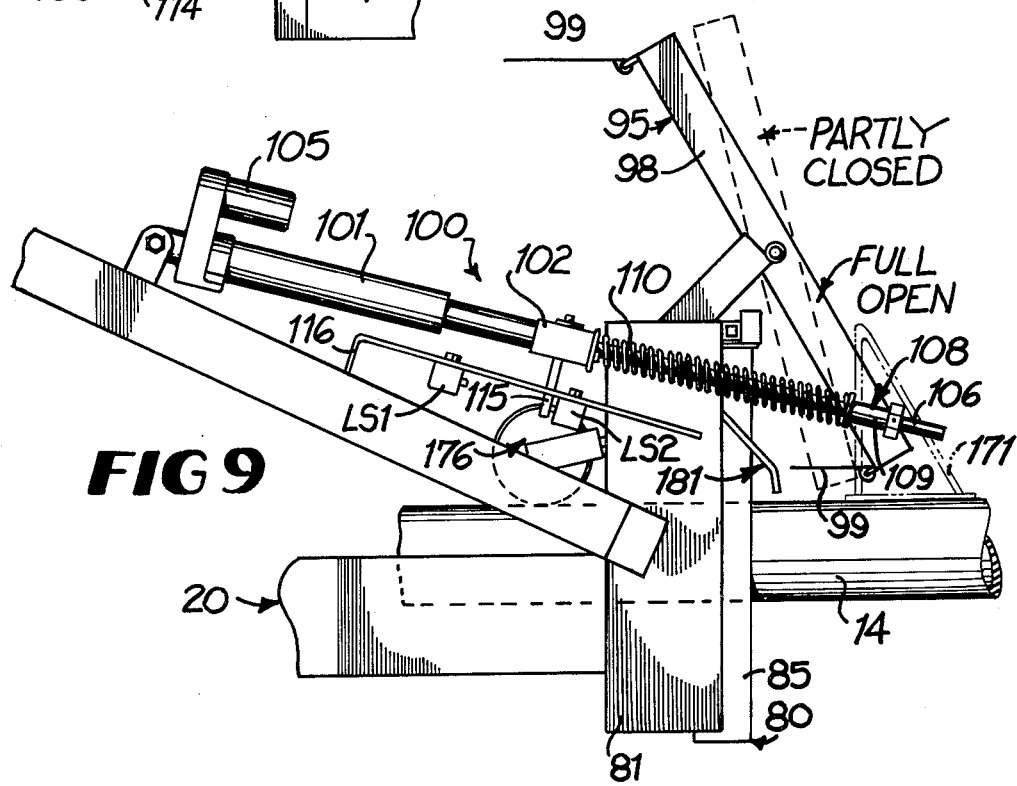

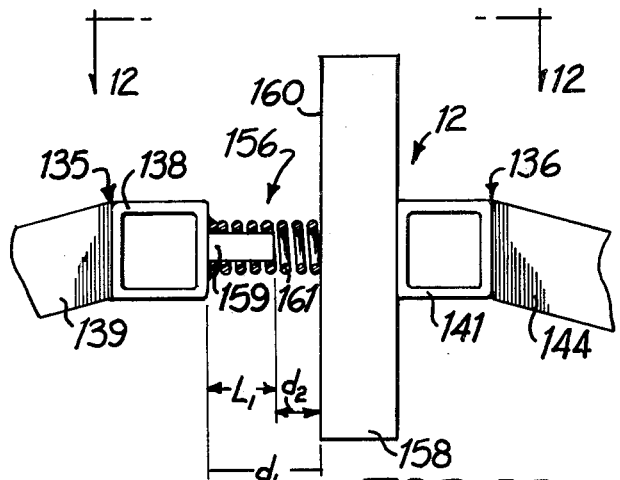
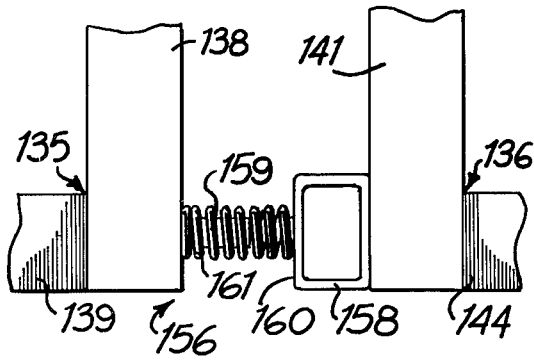
FIG 11        FIG 12
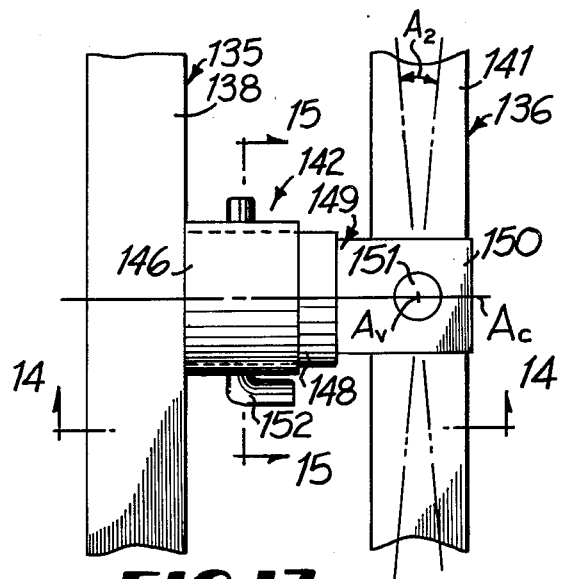
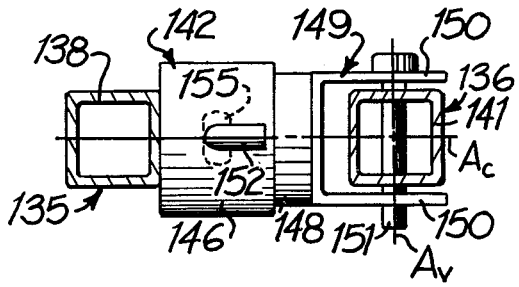
FIG 13        FIG 14
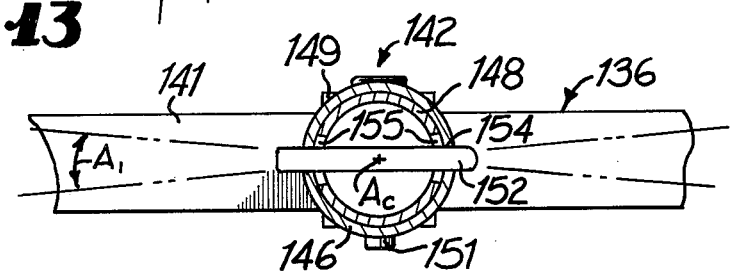
FIG 15

IRRIGATION SYSTEM

BACKGROUND OF THE INVENTION

1. Field of Invention

This invention relates generally to irrigation systems and more particularly to traveling type irrigation systems which wind a flexible water supply pipe to the sprinkler gun carriage around a reel to pull the sprinkler gun toward the reel as water is discharged from the sprinkler gun.

2. Discussion of Background Art

Irrigation systems using a non-collapsible flexible water supply pipe from a reel unit to the sprinkler gun carriage so that the pipe can be wound around a reel on the reel unit to tow the sprinkler gun carriage over the ground toward the reel unit have gained widespread acceptance because of their ability to irrigate areas with widely varying configurations and because they are easily moved from location to location.

One of the biggest problems associated with these prior art irrigation systems is the control of the speed of movement of the sprinkler gun carriage toward the reel unit so as uniformly to distribute the water over the entire length of the irrigation pattern. This is due primarily to the buildup of the hose on the reel as it is wound varying the speed of movement of the sprinkler gun carriage over the length of the run. Attempts have been made to compensate for this variance by incrementally changing the speed of rotation of the reel as each new layer of pipe is wrapped around the reel. Because the effective distance of the hose from the center of rotation of the reel may vary within a layer, or the layers may not increase by fixed increments, such attempts have not adequately controlled the speed of movement of the sprinkler gun carriage to assure uniform water distribution.

Another problem associated with the prior art irrigation systems is that no means was provided to shut off the water supply in the end of an irrigation run and they thus relied on the operator to keep checking the system to manually turn off the water supply at the end of the run or in the event a malfunction caused the carriage unit to stop during the run. Further, many of these prior art irrigation systems required that the carriage unit be disconnected from the reel unit at the end of a run and reconnected to the reel unit at the beginning of a run thereby requiring additional setup time between runs. These prior art irrigation systems further had no means to automatically shut down the system in the event of system malfunction so that damage to the various components of the system frequently resulted when a malfunction occurred. Also, these prior art irrigation systems required that the operator return to the system after it was connected to the water supply to start the system at the beginning of the run. No provision was made in these prior art systems to detect and display the actual speed of movement of the sprinkler gun carriage so that a manual measuring and timing operation was required to determine this speed.

SUMMARY OF THE INVENTION

These and other problems and disadvantages associated with the prior art are overcome by the invention disclosed herein by providing a reel type irrigation system in which the speed of movement of the supply pipe is monitored and the drive to the reel winding the supply pipe thereon is automatically adjusted to maintain a uniform speed of the sprinkler gun carriage toward the reel unit so as to uniformly distribute the water over the entire length of the irrigation pattern. Further, means is provided for automatically turning off the water supply at the end of a run or in the event a malfunction causes the carriage unit to stop during a run so as to prevent overwatering. The control unit controlling the operation of the system provides the desired speed of movement of the sprinkler gun carriage toward the reel unit to be manually selected at any rate and automatically sets the start and stop timer so as to affect uniform watering throughout the length of the irrigation pattern. Further, the carriage unit is provided with a suspension system that allows the carriage unit to track along a curved path and to conform to uneven terrain. The connection of the carriage unit to the supply pipe allows the carriage unit to be lifted to a transport position without having to be disconnected and reconnected to the supply pipe. A pressure switch means is provided for automatically activating the control system when the water supplied to the system reaches a prescribed pressure so that the operator does not have to return to the system after it is connected to the water source. The actual speed of movement of the supply pipe and thus the carriage unit is detected and visually displayed.

These and other features and advantages of the invention disclosed herein will become more apparent upon consideration of the following specification and accompanying drawings wherein like characters of reference designate corresponding parts throughout the several views and in which:

BRIEF DESCRIPTION OF THE DRAWINGS

FIG. 1 is a side elevational view of the reel unit of the invention;

FIG. 1a is a cross-sectional view taken generally along line 1a—1a in FIG. 1;

FIG. 2 is a rear elevational view of the reel unit;

FIG. 3 is a side elevational view of the carriage unit of the invention;

FIG. 4 is a view taken generally along line 4—4 in FIG. 3;

FIG. 6 is a cross-sectional view of the winding guide mechanism taken generally along line 6—6 in FIG. 2;

FIG. 7 is a view similar to FIG. 6 showing the control gate at a different position;

FIG. 8 is an enlarged side elevational view of the gate positioner of the invention;

FIG. 9 is a view similar to FIG. 8 showing the positioner in a different operative position;

FIG. 10 is an enlarged cross-sectional view taken generally along line 10—10 in FIG. 8;

FIG. 11 is an enlarged side elevational view taken generally along line 11—11 in FIG. 4;

FIG. 12 is a view taken generally along line 12—12 in FIG. 11;

FIG. 13 is an enlarged top view of the connector mechanism of the carriage unit;

FIG. 14 is a cross-sectional view taken generally along line 14—14 in FIG. 13;

FIG. 15 is a cross-sectional view taken generally along line 15—15 in FIG. 13.

Figure 5:
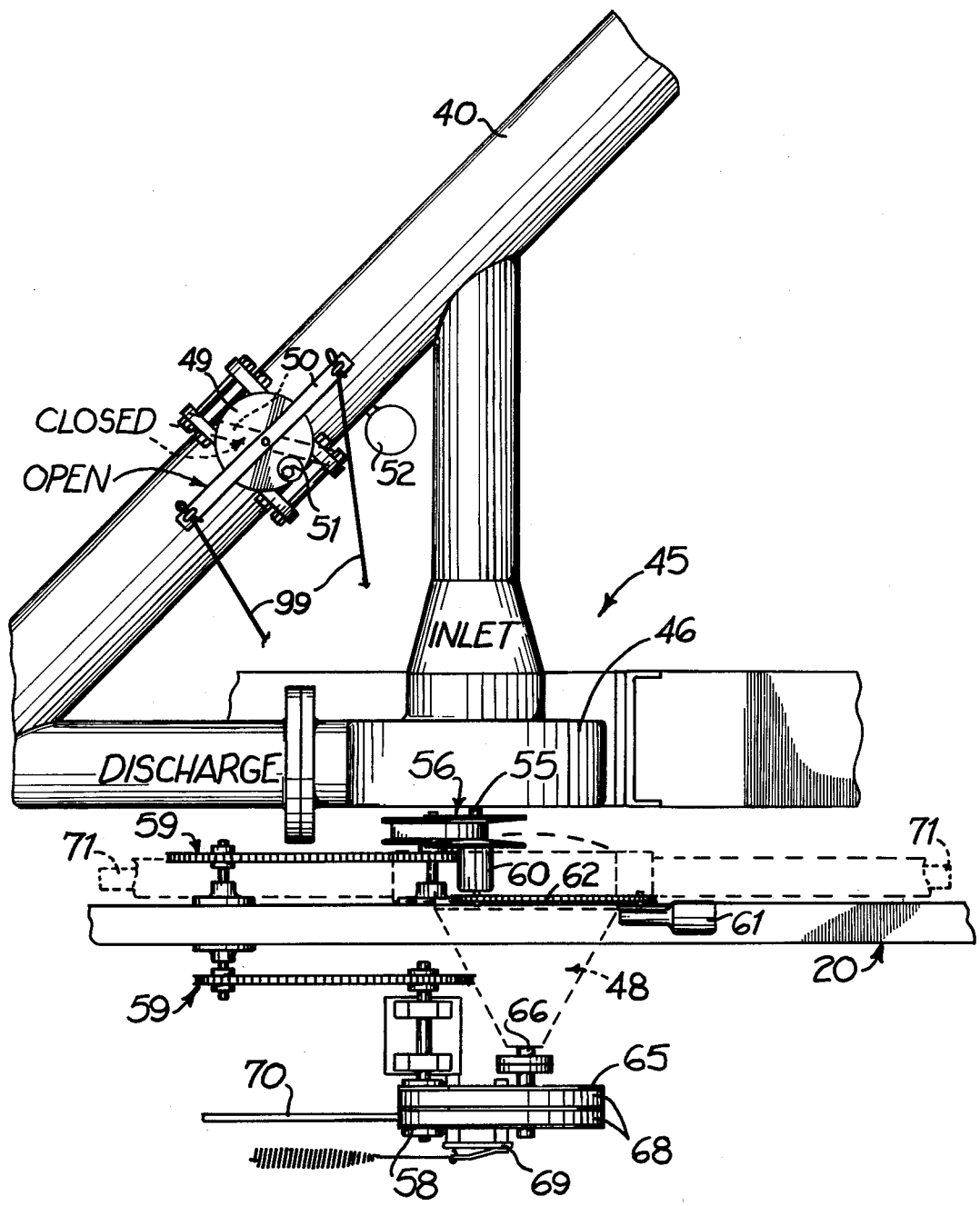
FIG. 5 is a view of the drive unit taken generally along line 5—5 in FIG. 1.

These figures and the following detailed description disclose specific embodiments of the invention; however, it is to be understood that the inventive concept is not limited thereto since it can be incorporated in other forms.

DETAILED DESCRIPTION OF ILLUSTRATIVE EMBODIMENTS

The irrigation system 10 includes generally a reel unit 11 seen in FIGS. 1 and 2 and a carriage unit 12 seen in FIGS. 3 and 4. A non-collapsible flexible supply pipe 14 connects the reel unit 11 to the carriage unit 12 so that, as the pipe 14 is wound up on the reel unit 11, the pipe 14 tows the carriage unit 12 toward the reel unit 11. The water to be distributed by the irrigation system is supplied to the reel unit from a conventional pressurized source (not shown) such as a pumping unit or a field located hydrant and supplied to the carriage unit 12 for distribution through the supply pipe 14. The pressurized water is used to also drive the reel unit to wind the supply pipe 14 on the reel unit and tow the carriage unit 12 toward the reel unit.

REEL UNIT

The reel unit 11 includes a support frame 20 supported by a pair of pneumatic tires 21 with a pipe reel 22 rotatably mounted on the support frame 20 for rotation about an axis normal to the longitudinal axis of frame 20. The front end of the frame 20 is provided with a hitch 24 so that the reel unit 11 may be connected to a vehicle and towed from location to location. A movable support stand 25 is provided adjacent the front end of frame 20 to be lowered as seen in FIG. 1 to support the front end of the frame when it is unhitched.

The reel 22 is supported on an axle pipe 27 which serves as the axle of the reel and also to supply water to the supply pipe 14 wound on the reel. Radial supports 26 mount a cylindrical support wall 28 concentrically of the rotational axis of reel 22 and a pair of annular retaining sections 29 at opposite ends of the wall 28 so that an outwardly opening annular winding channel 30 is defined between sections 29 and wall 28 in which the supply pipe 14 is wound. That end of the supply pipe 14 at the reel unit 11 is connected to the axle pipe of the reel by a transfer pipe 31 with the supply pipe 14 wound around the support wall 28 in layers. The outer peripheral edge of each of the retaining sections 29 is defined by a channel ring 32. The channel rings 32 have a U-shaped cross-section to define an outwardly opening channel 34 therein. A plurality of chain engaging teeth 35 are mounted on each channel ring 32 at circumferentially spaced apart positions in the channel 34 to be engaged for drivingly rotating the reel 22 as will become more apparent.

Water is supplied to the axle pipe in reel 22 by a manifold pipe 40 connected to one end of the axle pipe by a rotary joint 41. The inlet end of manifold pipe 40 is connected to the pressurized water source with a flexible hose 42.

A drive unit 45 is mounted on frame 20 for rotating the reel 22. The drive unit 45 includes a water driven turbine 46 which drives a differential 48 which in turn drives the reel 22. As best seen in FIG. 5, the inlet to the turbine 46 is connected to the manifold pipe 40 at a first position and the outlet thereof is connected to pipe 40 at a second position spaced downstream of the first position. A flow control valve 49 is positioned in manifold pipe 40 between the first and second positions so that the valve 49 can be adjusted to divert the desired amount of the water flowing through manifold pipe 40 through the turbine 46 to power it. The valve 49 is provided with a control arm 50 to operate the valve and an adjustable stop 51 to limit the amount of closure of valve 49 as will become more apparent. A pressure switch 52 is provided on pipe 49 to be responsive to the incoming water pressure as will become more apparent.

The output shaft 55 of the turbine 49 is connected to the input of a variable speed belt drive 56. The output of the variable speed drive 56 is connected to a drive pulley 58 through a speed reducing chain drive arrangement 59. The adjustable speed controller 60 on the variable speed drive 56 is driven by a reversible control motor 61 through a control chain 62. Thus, the output speed of drive 56 relative to its input speed can be selectively adjusted over a prescribed range by selectively operating motor 61.

The drive pulley 58 is connected to a driven pulley 65 mounted on input shaft 66 of the differential 48 by drive belts 68. A manually operated belt tensioner 69 is provided to selectively maintain driving tension in belts 78 when the turbine 46 is driving differential 48 or to selectively remove tension from belts 68 to effectively disconnect turbine 46 from differential 48 when the pipe 14 is being unwound from reel 22 as will become more apparent. Control rod 70 is provided on tensioner 69 to permit its manual operation.

The output shafts 71 on differential 48 are oriented parallel to the rotational axis of reel 22 and are spaced forwardly of reel 22 as best seen in FIG. 1. Each output shaft 71 mounts a drive sprocket 72 on its outer end so that one of the drive sprockets 72 is in alignment with each of the channel rings 32 on the reel 22. One drive chain 74 extends around one of the drive sprockets 72 and the channel 34 in the channel ring 32 in alignment therewith while another drive chain 74 extends around the other drive sprocket 72 and the channel 34 in the channel ring 32 in alignment therewith. The drive chains 74 engage the teeth 35 in channel rings 32 to rotate the reel 22 as the differential 48 rotates drive sprockets 72. Tensioners 75 maintain driving tension in the drive chains 74. It will thus be seen that the use of differential 48 serves to evenly distribute the driving force on the reel 22 to reduce reel and frame flex as the pipe 14 is wound around reel 22. Further, breakage of one of the chains 74 stops rotation of reel 22 to prevent damage thereto. The speed of rotation of reel 22 is selectively controlled through motor 61 to adjust the setting of the variable speed drive 56.

The supply pipe 14 passes out through the rear end of the reel unit 11 to the carriage unit 12. To insure that the pipe 14 is wound on the reel 22 in uniform layers, winding guide assembly 80 is provided at the rear end of the reel unit to move the pipe back and forth across the winding channel 30 in the reel 22 as best seen in FIGS. 2, 6 and 7. The winding guide assembly 80 includes a pair of spaced apart upstanding supports 81 mounted on the rear end of the frame 20 on opposite sides of reel 22. A fixed support tube 82 extends between the lower portions of supports 81 and a positioning tube 84 extends between the upper portions of the supports parallel to the support tube 82. A vertically extending open rectangular support frame 85 is movably supported between the positioning tube 84 and support tube 82. The lower end of frame 85 is equipped with upper and lower concave support rollers 86 that rotatably engage the top and bottom of support tube 82 and the upper end of frame 85 is equipped with positioning rollers 88 that engage opposite sides of positioning tube 84 so that frame 85 can be moved back and forth along tubes 82 and 84. The pipe 14 extends through the opening in frame 85 and is supported therein by guide rollers 89 rotatably mounted on frame 85 to confine the pipe 14 on its top, bottom and sides.

To move the support frame 85 and pipe 14 back and forth along the tubes 82 and 84, a drive worm 90 is rotatably journalled between the upper portions of the supports 81 parallel to tubes 82 and 84. The drive worm 90 is made out of a self-lubricating plastic material such as nylon and has a reversing type worm groove 91 formed therein. The support frame 85 is provided with a collar 92 which extends around worm 90 and has a stainless steel drive pin 94 which projects into the worm groove 91 to cause the drive worm 90 to move the frame 85 back and forth as drive worm 90 is rotated. To synchronize the movement of the frame 85 with the reel 22, a chain and sprocket arrangement 95 drivingly connects the axle pipe 27 of reel 22 to the drive worm 90 as best seen in FIG. 2. By using the self-lubricating plastic material for drive worm 90 and by using the stainless steel drive pin 94, the need for lubricating the winding guide assembly 80 is eliminated.

To control the operation of valve 49 to start and stop operation of turbine 46 in the drive unit 45, a control gate 95 is pivotally mounted on the supports 81 of the winding guide assembly 80. The control gate 95 has a horizontally extending bottom member 96 extending across the winding guide assembly 80 just above the supply pipe 14 and a pair of upstanding end members 98 attached to opposite ends of the bottom member 96. The end members 98 are pivotally mounted on the supports 81 about a common horizontal pivot axis so that the gate 95 can pivot over the pipe 14. Cables 99 connect the end members 98 with the control arm 50 of valve 49 so that when the bottom member 96 on gate 95 is moved toward the winding guide assembly 80 to the dashed line position seen in FIGS. 6 and 9, the control arm 50 is pivoted to open valve 49 as seen by the solid line position of arm 50 in FIG. 5 so that the incoming water is not diverted through turbine 46. When the bottom member 96 on gate 95 is moved away from winding guide assembly 80 to the solid line position seen in FIGS. 6 and 9, the control arm 50 is pivoted to the stop 51 to close valve 49 as seen by the dashed line position in FIG. 5 so that the water is diverted through turbine 46 to drive the reel 22.

A positioner 100 is provided for moving the gate 95 between its fully closed position adjacent the winding guide assembly 80 as best seen in FIG. 8 to its fully open position away from the assembly 80 as best seen in FIG. 9. The positioner 100 is pinned between the support frame 20 and the lower end of one of the end members 98 on gate 95.

Positioner 100 includes a base unit 101 pinned to the frame 20 with a selectively extendable drive member 102. The base unit 101 has an internal drive screw 104 threaded by and connected to drive member 102 so that when the reversible drive motor 105 rotates drive screw 104, the drive member 102 can be selectively extended from or retracted into base unit 101. A positioning rod 106 is attached to the projecting end of drive member 102 and extends therefrom coaxially therewith. A connector 108 pivotally connects the positioning rod 106 to the gate 95. The connector 108 includes a sleeve 109 slidably received over the positioning rod 106 with a compression type spring 110 positioned around rod 106 between the sleeve 109 and the drive member 102. Movement of sleeve 109 toward the projecting end of the positioning rod 106 is arrested by an abutment 111 adjustably mounted on rod 106 outboard of sleeve 109. A pivot stud 112 is attached to sleeve 109 and projects perpendicularly outward therefrom. The stud 112 is pivotally received through a mounting tube 114 on the end member 98 of gate 95 to pivotally connect the connector 108 to the gate 95.

The spring 110 normally urges connector 108 against abutment 111 so that the gate 95 is moved between its open and closed positions as base unit 101 on positioner 100 extends and retracts the drive member 101. When the gate 95 is in its open position as seen in FIG. 9, the gate 95 can be forced to a partly retracted position as seen by dashed lines in FIG. 9 by forcing connector 108 to slide along the positioning rod 106 toward drive member 102 and compressing spring 110. This allows the gate 95 to be moved sufficiently to open valve 49 and stop turbine 46 without the positioner 100 having to be operated. The forcing of the gate 95 to the partly retracted position is carried out by the carriage unit 11 at the end of its run as will become more apparent.

The drive member 102 is provided with an actuator projection 115 which extends through an appropriate slot in a switch mounting bracket 116 fixedly supported adjacent the drive member 102. A pair of limit switches LS1 and LS2 are adjustably mounted on bracket 116 so that actuator projection 115 activates switch LS1 when the gate 95 is pivoted to its fully closed position and activates switch LS2 when gate 95 is pivoted to its fully open position. Switches LS1 and LS2 are used to stop the motor 105 as will become more apparent.

A combination lift/anchor assembly 120 is provided for anchoring the reel unit 11 while it is towing the carriage unit 12 toward it and for lifting the carriage unit 12 during transport between different locations. The assembly 120 includes a pair of interconnected lift arms 121 pivoted on the rear end of support frame 20 so that they can be raised and lowered as a unit. A drive arm 122 is connected to arms 121 to lift the arms 121 as arm 122 is pivoted. A winch 124 is connected to the drive arm 122 to pivot it. The lift arms 121 extend rearwardly from frame 20 parallel to each other and the longitudinal axis of frame 20. The arms 121 are also equally spaced outwardly on opposite sides of the longitudinal axis of frame 20 with a spacing between the projecting portions thereof so that they will fit under the carriage unit 12 as will become more apparent. The arms 121 are each provided with an offset so that the inboard ends extend on opposite sides of the frame 20.

The projecting ends of each of the lift arms 121 are provided with ground engaging angles 125 that dig into the ground when the lift arms 121 are lowered to hold the reel unit 11 in position while it is pulling in the carriage unit 12. A locating flange 126 is also provided on each of the arms 121 which cooperates with the angle 125 thereon to locate the carriage unit 12 on the lift arms 121 as they are raised. It will be appreciated that the pipe 14 is wound on reel 22 so that the carriage unit 12 is centered on the longitudinal axis of frame 20 at the end of a run and the carriage unit 12 will automatically be located over the lift arms 121 at that time. The operator simply operates the winch 124 at that time to lift the arms 121 out of ground engaging contact and into engagement with the carriage unit 12 to lift it off of the ground to transporting position.

CARRIAGE UNIT

The carriage unit 12 is best seen in FIGS. 3 and 4 and includes a base frame 130 which mounts four pneumatic tires 31 thereon to support the carriage unit on the ground. An upstanding mounting pipe 132 is mounted on the base frame 30 and is provided with a conventional oscillating sprinkler gun 134 at the upper end thereof. The supply pipe 14 is connected to the lower end of the main pipe 32 so that water supplied to the carriage unit 12 through the supply pipe 14 will be discharged through the sprinkler gun 134 to distribute the water over the ground as the carriage unit 12 is pulled over the ground by the supply pipe 14.

The base frame 130 is arranged along a longitudinal axis $A_C$ and includes front and rear axle assemblies 135 and 136 respectively. The front axle assembly 135 includes a front axle support tube 138 extending transversely of the carriage axis $A_C$ and is provided on opposite ends thereof with a pair of axle support members 139 which extend forwardly of the axle support tube 138 and angle downwardly therefrom. The axle support members 139 are equally spaced on opposite sides of the axis $A_C$. Each of the axle support members 139 mounts a stub axle 140 thereon which projects outwardly from the support member 139 normal to the axis $A_C$ and rotatably mounts one of the pneumatic tires 131 thereon.

The rear axle assembly 136 includes a rear axle support tube 141 which is movably connected to the center of the front axle support tube 138 by connector assembly 142 so that the rear axle support tube 141 extends generally parallel to the front axle support tube 138 and perpendicular to the carriage axis $A_C$ as will become more apparent. Opposite ends of the rear axle support tube 141 are provided with a pair of rearwardly extending axle support members 144 which angle downwardly from the rear axle support tube 141 similarly to that of axle support members 139 on front axle support tube 138. The axle support members 144 each mount an outwardly extending stub axle 145 thereon which rotatably mounts one of the pneumatic tires 131 thereon so that the front and rear sets of pneumatic tires 131 have a common tire spacing.

A connector assembly 142 interconnects the front and rear axle assemblies 135 and 136 so that the rear axle assembly 136 can pivot about the carriage axis $A_C$ so that the carriage unit 12 can track over uneven terrain. The connector assembly 142 also connects the rear axle assembly 136 to the front axle assembly 135 so that the rear axle assembly 136 can pivot about a vertical axis centered on the rear axle assembly 136 so that the carriage unit 12 can track along a curved path as the carriage unit 12 is towed back to the reel unit 11 as will become more apparent. The connector assembly 142 is best seen in FIGS. 13–15 and includes generally a base collar 146 centrally mounted on the front axle support tube 138 about the axis $A_C$ and projects rearwardly therefrom toward the rear axle support tube 141. A pivot tube 148 is rotatably mounted in the base collar 146 and projects rearwardly therefrom out of the base collar 146. The rearwardly projecting end of the pivot tube 148 is provided with a clevis member 149 whose rearwardly extending legs 150 project over and under the rear axle support tube 141. A vertically extending pivot pin 151 pivotally connects the legs 150 with the rear axle support tube 141 so that the rear axle support tube 141 can pivot with respect to the clevis member 149 about a generally vertical axis $A_C$. A transversely extending connector pin 152 extends through opposed aligned holes 154 in the base collar 146 to keep the connector pin 152 fixed with respect to the base collar 146. The pivot tube 148 is provided with a pair of opposed elongate slots 155 in registration with the holes 154 in the base collar 146 so that the connector pin 152 extends through these slots 155 to maintain the pivot tube 148 axially fixed with respect to the base collar 146. The slots 155, however, permit the pivot tube 148 to pivot with respect to the base collar 146 about the carriage axis $A_C$. This allows the rear axle assembly 136 to pivot about the carriage axis $A_C$ through the included angle $A_1$ as seen in FIG. 15 so that the rear axle assembly 136 can pivot with respect to the front axle assembly 135 in order for the tires 131 to remain in contact with the ground even though the terrain may be uneven. The slots 155 limit the amount of pivoting that can be accommodated by the connector assembly 142 to keep the front and rear axle support tubes 138 and 141 operatively associated with each other as will become more apparent.

To maintain the position of the front and rear axle support tubes 138 and 141 with respect to each other about the vertical axis $A_V$, a pair of positioning assemblies 56 are provided which interconnect the opposite ends of the front and rear axle support tubes 138 and 141. As best seen in FIGS. 11 and 12, each positioning assembly 156 includes a vertically oriented bearing tube 158 attached to the end of the rear axle support tube 141 and equally projecting above and below the support tube 141. Mounted on the end of the front axle support tube 138 in opposition to the bearing tube 158 is a support pin which extends horizontally toward the bearing tube 158 from the front axle support tube 138. The support pin 159 has a length $L_1$ which is less than the distance $d_1$ between the front axle support tube 138 and the bearing tube 158 when the front and rear axle support tubes 138 and 141 are parallel to each other as best seen in FIG. 11. This allows the ends of the front and rear axle support tubes 138 and 141 to move toward each other the distance $d_2$ before the rearwardly projecting end of the support pin 159 engages the front bearing surface 160 on the bearing tube 158. Since a support pin 159 is located on opposite ends of the front axle support tube 138 and since a bearing tube 158 is located on opposite ends of the rear axle support tube 141, one of the support pins 159 limits the pivotal movement of the rear axle assembly 136 in one rotational direction about the axis $A_V$ while the other support pin 159 limits the pivotal movement of the rear axle assembly 136 in the other rotational direction about the axis $A_V$ so that the rear axle support tube 141 can pivot through the included angle $A_2$ as best seen in FIG. 13. To normally urge the front and rear axle support tubes 138 and 141 toward a normal position parallel to each other, each positioning assembly 156 also includes a compression type coil spring 161 received around the support pin 159 and bearing against the front bearing surface 160 on the bearing tube 158 and the rear surface on the front axle support tube 138. That end of the coil spring 161 bearing on the front axle support tube 138 is welded thereto to hold the coil springs 161 in place. The coil springs 161 are selected so that when the forces exerted between opposite ends of the front and rear axle assemblies 135 and 136 are equalized, the front and rear axle support tubes 138 and 141 will be generally parallel to each other. Thus, as the carriage unit 12 needs to track along a curved path, the rear axle assembly 136 can pivot about the vertical axis $A_V$ against the springs 161 so that the carriage unit 12 can follow this curved track; however, as the track straightens, the springs 161 will move the front and rear axle assemblies 135 and 136 back to the straight tracking position so that the carriage unit 12 continues to track the desired path. This permits the carriage unit 12 to track along the path along which the supply tube 14 is laid out from the reel unit 11 even though the path is curved without the supply pipe 14 having to drag one set of the tires 131 sidewise to achieve the tracking.

The mounting pipe 132 is centrally mounted on the front axle assembly 135. The mounting pipe 132 has a straight portion 162 which is vertically oriented above the front axle assembly 135 and a curved portion 164 at its lower end which projects forwardly of the straight portion 162 to provide a forwardly facing horizontally oriented connection thereon. The upper end of the straight portion 162 is provided with a rotary coupling 165 which mounts the sprinkler gun 134 thereon so that, as the water is discharged through the sprinkler gun 134, the sprinkler gun oscillates back and forth through a prescribed arc as is conventional to distribute the water on the ground over this prescribed arc. The front end of the curved portion 164 of the mounting pipe 132 is connected to one end of a flexible hose 166, the front end of which is attached to a coupler 168. The forwardly projecting end of the coupler 168 is in turn connected to the end of the supply pipe 14 to connect the supply pipe 14 to the carriage unit 12.

The coupler 168 is pivotally mounted between the ends of a pair of pivot arms 169 whose rearwardly projecting ends are pivotally mounted on the front axle assembly 135. The pivot arms 169 serve to drivingly connect the coupler 168 to the front axle assembly 136 of the base frame 130 so that the carriage unit 12 is towed by the supply pipe 14 through this connection and the flexible hose 166 does not have to carry any of the towing force to the carriage unit 12. The pivot arms 169 further serve to permit the height of the end of the supply pipe 14 connected to the couple 168 to be moved up and down while connection to the mounting pipe 132 is maintained through the flexible hose 136. The pivot connectors 170 connecting the pivot arms 169 to the front axle assembly 139 also serve to limit the up and down movement of the end of the supply pipe 14 to a range likely to be encountered as the carriage unit 12 is towed toward the reel unit 11.

Fixedly mounted on the end of the supply pipe 14 at the coupler 168 is a gate engaging member 171 which is adjustably held in position by a pair of clamps 172. The gate engaging member 171 serves to engage the bottom member 96 on the control gate 95 at the end of a run to pivot the control gate 95 from its fully open position to its partly retracted position as seen by the dashed lines in FIG. 9 against the spring 110 in the positioner 100. This serves to open the control valve 49 so that the water being supplied to the system passes through the manifold pipe 40 without being diverted through the turbine 46 so that the winding of the supply pipe 14 on the reel 22 is stopped. The position of the gate engaging member 171 on the supply pipe 14 is adjusted with the clamps 172 so that, when the gate engaging member 171 has displaced the gate 95 to the partly closed position seen in FIG. 9, the front and rear axle support tubes 138 and 141 will be located in registration over the space between the ground engaging angles 125 and the flanges 126 on the lift arms 121 of the lift/anchor assembly 120. This permits the carriage unit 12 to automatically be lifted off the ground to a transport position as the lift arms 121 are raised with the winch 124. The carriage unit 12 is shown in its position ready to be lifted in FIG. 1 by dashed lines.

Typically, the reel unit 11 with the carriage unit 12 carried on the lift/anchor assembly 120 is towed to the location at which the carriage unit 12 is to be located at the start of its run. The carriage unit 12 is released from the assembly 120 and remains stationary while the reel unit 11 is towed to the end of the run to unwind the pipe 14. To hold the carriage unit 12 stationary while the pipe 14 is being unwound, an anchoring assembly 190 is provided on carriage unit 12 as seen in FIG. 3.

The anchoring assembly 190 includes a support tube 191 centrally mounted on the rear of the rear axle support tube 141. An anchoring pin 192 is provided which has a locating collar 194 fixedly yet removably attached thereto at a position spaced below the upper end of pin 192. A connecting chain 195 connects collar 194 with support tube 191 so that when the pointed lower end of pin 192 is driven into the ground behind the carriage unit 12 as shown by phantom lines in FIG. 3, it holds the carriage unit 12 in place through chain 195 as the pipe 14 is unwound. When the reel unit 11 is started, it has enough power to pull the pin 192 out of the ground. At the end of the run, the pin 192 can be dropped through the support tube 191 for storage as seen by solid lines in FIG. 3.

When the system is being operated in hilly terrain, the pin 192 can also be used as a brake to keep pipe 14 taut as the carriage unit is pulled toward the reel unit. To do this, the collar 194 can be removed from pin 192 in order that it drops lower in tube 191 so that the lower end of pin 192 projects below ground level as seen by dashed lines in FIG. 3. This is sufficient to hold back on carriage unit 12 sufficiently to keep pipe 14 taut so that the speed of carriage unit 12 does not change as it does up and down the hilly terrain.

Figure 16:
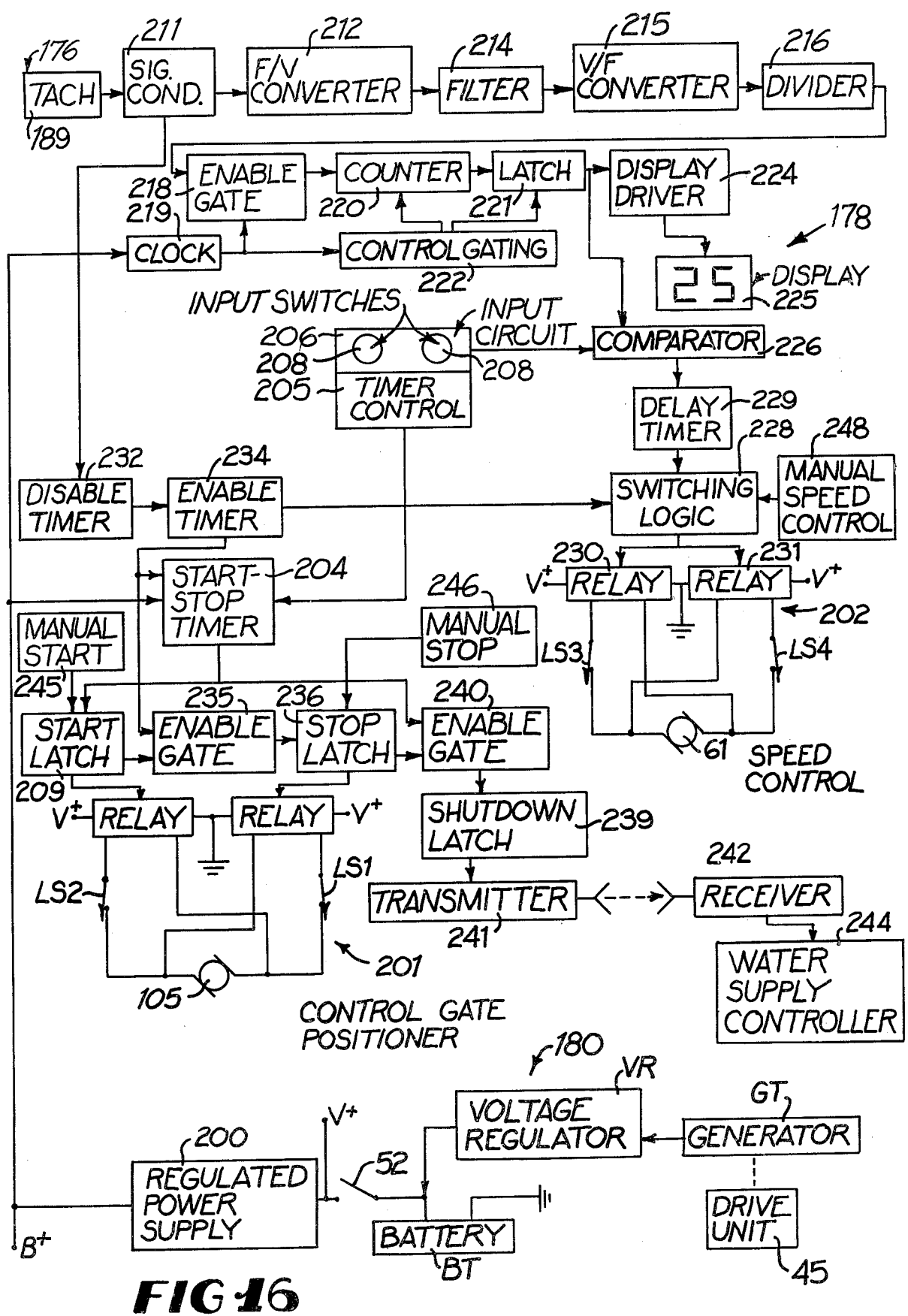
FIG. 16 is a schematic diagram illustrating the control circuit of the invention.

A control unit 175 seen in FIG. 1 and schematically illustrated at FIG. 16 is provided for controlling the overall operation of the system 10. The control unit 175 senses the speed of the supply pipe 14 as it moves toward the reel unit 11 and operates the control motor 61 in the drive unit 45 to maintain the desired speed of movement of the carriage unit 12 toward the reel unit 11. The control unit 175 includes a tachometer assembly 176 mounted on the support frame 85 of the winding guide assembly 80 as seen in FIGS. 6 and 7 to contact the supply pipe 14 moving therethrough and generates an electrical output signal representative of the linear speed of pipe 14 with respect to frame 85. Since the reel unit 11 is stationary as the pipe 14 is reeled thereon, the speed of pipe 14 with respect to frame 85 is thus representative of the ground speed of pipe 14 and carriage unit 12. Control unit 175 also includes a master control circuit 178 schematically illustrated in FIG. 16 which is contained in housing 179 on reel unit 11 as seen in FIG. 1. The control circuit 178 receives the output from tachometer assembly 176, compares this signal with a reference signal, and operates control motor 61 to change the speed ratio of the variable speed belt drive 56 in drive unit 45 until the indicated speed of movement from tachometer assembly 176 matches the reference signal to cause the pipe 14 to be moved at the desired rate toward the reel unit 11. The control circuit 178 is powered from an electrical power supply 180 schematically shown in FIG. 16.

The tachometer assembly 176 is mounted on support frame 85 as best seen in FIGS. 6 and 7 so that it can be raised out of contact and lowered into contact with the supply pipe 14 in response to the closing and opening of control gate 95. Assembly 176 includes a U-shaped support yoke 181 whose legs 182 are pivotally mounted about a common horizontal pivot axis on opposite sides of frame 85. The central portion of yoke 181 extends forwardly of frame 85 and mounts a pair of support plates 184 centrally thereon which project forward of yoke 181. The plates 184 rotatably mount a tachometer wheel 185 therebetween so that wheel 185 is centered over pipe 14 passing through frame 85. The rearwardly projecting ends of legs 182 extend past the support frame 85 so that the bottom member 96 on control gate 95 will engage legs 182 and pivot yoke 181 so as to lift the wheel 185 out of contact with the pipe 14 when gate 95 is fully closed as seen in FIG. 7. As gate 95 is moved toward its open position, the wheel 185 will be lowered into contact with the top of pipe 14 as seen in FIG. 6. The legs 182 are arranged so that the gate 95 will not pivot yoke 181 until gate 95 is moved from its partly closed position as shown by dashed lines in FIG. 6 to its fully closed position as seen in FIG. 7 so that wheel 185 remains in contact with pipe 14 while gate 95 is in the partly closed position.

The wheel 185 is provided with a peripheral tread 186 that contacts the surface of pipe 14 so that movement of pipe 14 rotates wheel 185 at the same speed as pipe 14 is moving. The wheel 185 is provided with a plurality of holes 188 therethrough on equal circumferential spacings which cooperate with a photoelectric transmitter 189 mounted on support plates 184 adjacent wheel 185 to produce a binary electrical output signal whose frequency is representative of the rotational speed of wheel 185 and thus the linear speed of pipe 14.

The electrical power supply 180 includes an electrical storage battery BT which is recharged with a generator GT appropriately connected to the output of the turbine 46 and equipped with a voltage regulator VR as schematically shown in FIG. 16. The output of the power supply 180 is connected to circuit 178 through pressure switch 52 so that circuit 178 is not powered until switch 52 is closed by the water pressure in manifold pipe 40 reaching a minimum prescribed pressure, typically about two-thirds of operating pressure. This allows the control unit 175 to be preset before the water is supplied to the system 10 and the operation of the system to be automatically started as soon as water pressure is available so that the operator does not have to return to the reel unit 11 after the pressurized source of water is activated.

The pressure switch 52 connects the unregulated voltage output from the power supply 180 to a regulated power supply 200 which produces a regulated voltage output B+ to power the various components in the control circuit 178 as is known in the art. Thus, the control circuit 178 is powered when the pressure switch 52 closes indicating that there is operating pressure in the manifold pipe 40. Typically, switch 52 will not close until the water has filled the supply pipe 14 and is starting to discharge water from the sprinkler gun 134. The control circuit 176 has a start/stop subcircuit 201 which controls the operation of the control motor 105 in the positioner 100 for the control gate 95 and a speed control subcircuit 202 which controls the control motor 61 to the variable speed drive 56. It will be appreciated that when automatic operation of the system is started, the control gate 95 is fully closed so that the tachometer assembly 176 is lifted out of contact with the supply pipe 14 and there will thus be no output signal therefrom.

As soon as the regulated power supply 200 produces the regulated output voltage B+, a start/stop timer circuit 204 is powered to start timing the beginning of the irrigation cycle. The start/stop timer circuit 204 permits the carriage unit 12 to remain stationary in the beginning of the run until the proper amount of water has been distributed to achieve uniform watering over the complete length of the run. This time that the carriage unit remains stationary at the beginning of the run, of course, varies with the speed at which the carriage unit 12 is to be moved during the run. Thus, the timing cycle of the start/stop timing circuit 204 is adjustable. The timing cycle of the start/stop timer circuit 204 is controlled by a timer control network 205. The timer control network 205 is in turn operatively connected to an input switch circuit 206 provided with a pair of input switches 208 that permit the desired speed at which the carriage unit 12 is to be moved toward the reel unit 11 to be manually inputted. In the particular input circuit 206, the input switches 208 are designed to adjust the speed control subcircuit 202 so that the speed can be adjusted in one inch per minute intervals from 0-99 inches per minute of travel. The input switch circuit 206 produces a binary output signal whose magnitude corresponds to that which the tachometer assembly 176 should be producing at the desired speed of travel of the carriage unit 12. The timer control circuit 205 includes a plurality of resistors arranged in a binary arrangement and connected to the input circuit 206 so that the output of the timer control circuit 205 to the start/stop timer circuit 204 causes the timing cycle of the timer circuit 204 to correspond to the desired rate of travel to be maintained in the carriage unit 12 so that uniform distribution of the water will be achieved at the beginning of the run to match that achieved during the run.

When the start/stop timer circuit 204 times out, it generates an output to a start latch 209 which in turn energizes a start control relay 210 appropriately connected to the control motor 105 on positioner 100 through a limit switch LS2 to cause the control motor 105 to rotate in the appropriate direction to extend the drive member 102 and pivot the control gate 95 to its fully open position as seen in FIG. 9. When the control gate 95 reaches its fully open position, the actuator projection 115 on drive member 102 engages the limit switch LS2 to stop motor 105. This serves to transfer the control valve 49 connected to the gate 95 through the control cables 99 to its diverting position so that water will be diverted through the turbine 46 to cause it to rotate and thus rotate the reel 22 so that the pipe 14 starts winding upon the reel 22. Opening the control gate 95 also lowers the tachometer assembly 176 into contact with the pipe 14 so that the moving pipe 14 generates its output signal.

The output signal from the tachometer assembly 176 is fed to a signal conditioning circuit 211 to square up the output signal from the tachometer assembly 176. The conditioned signal output from the signal conditioning circuit 211 is passed through a frequency-to-voltage converter circuit 212 which converts the frequency modulated conditioned speed signal to an amplitude modulated output signal. The amplitude modulated output signal is fed through a ripple type filtering circuit 214 which serves to filter out any spikes of short duration in the signal and the filtered signal is fed to voltage-to-frequency converter circuit 215 which converts the filtered signal from an amplitude modulated signal back to a frequency modulated signal. This arrangement serves to produce an output signal which is representative of the mean speed at which the supply pipe 14 is moving past the tachometer assembly 176. One of the problems in sensing the speed of the supply pipe 14 is that the friction between the ground and the pipe may cause the supply pipe 14 to move erratically for short periods of time and the speed of the supply pipe 14 past the tachometer assembly 176 during these periods of time will produce readings which are not representative of the mean speed of the supply pipe 14 toward the reel 22.

The converted mean signal output from the converter circuit 215 is passed through a divider circuit 216 to match the indicated speed of travel of the supply pipe 14 with the reference signal from the input circuit 206 as will become more apparent. The divided signal output from the divier circuit 216 is passed to an enable gate 218. The enable gate 218 is triggered by a clock circuit 219 to feed the divided signal representative of the actual mean speed of movement of the supply pipe 11 through the enable gate into a counter circuit 220 for a selected sampling. In the particular circuit shown, the enable gate 218 is triggered so that the output signal is sampled into the counter circuit 220 for one-half second at one-half second intervals. The count accumulated in the counter circuit 220 representative of the input signal from the enable gate 218 is transferred into a latch circuit 221 under the control of a control gating circuit 222 also controlled by the clock circuit 219 to store the sampled signal in the latch circuit 221. The control gating circuit 222 also causes this stored signal in latch circuit 221 to be transmitted through a display driver circuit 224 to a liquid crystal display 225 so that the liquid crystal display 225 indicates the actual mean speed at which the supply pipe 214 is moving. In the particular circuit 176 shown, the liquid crystal display 225 displays the speed of travel in inches per minute with a speed of 25 inches per minute being shown on the display 225.

The output of the latch circuit 221 is also connected to a comparator circuit 226. The reference output generated by the input switch circuit 206 is likewise connected to the comparator 226. The comparator circuit 226 compares the output signal from the latch circuit 221 representative of actual mean pipe speed with the reference signal from the input switch circuit 206 and generates comparison output signal representative of the comparison between these two input signals. This comparison signal is transmitted to a switching logic network 228 through a delay timer circuit 229. The delay timer circuit 229 serves to delay the transmission of the comparison output signal from the comparator circuit 226 to the switching logic netowrk 228 for a prescribed period of time and is cycled each time the compared output from comparator circuit 226 changes state. The delay timer circuit 229 serves to prevent adjustment of speed control for fluctuations of the actual speed signal relative to the reference signal of short duration. Typically, the timing cycle of the delay timing circuit 229 is set for about 10 seconds. If the compared signal output from comparator circuit 226 does not change state before the delay timer circuit 229 times out, then the compared output from the comparator circuit 226 is transmitted to the switching logic network 228.

This causes the switching logic network 228 to appropriately operate the control motor 61 to the variable speed drive 56 to change the rotational speed of the reel 22. If the comparator circuit 226 indicates that the pipe 14 is moving at a speed less than the desired speed indicated by the reference signal for input switch circuit 206, then the switching logic network 228 activates an increase relay 230 to power the speed control motor 61 with the unregulated V+ voltage from the power supply 180 through the limit switch LS3. The limit switch LS3 is appropriately associated with the variable speed drive 56 so that limit switch LS3 is opened in the event the motor 61 drives the variable speed drive 56 to its maximum speed position. As the speed of the reel 22 is increased, the speed of movement of the pipe 14 also increases which causes the output signal from the latch circuit 221 to increase until the signal from latch circuit 221 matches the reference signal from the input switch circuit 206 to cause the compared output of the comparator circuit 226 to change state. This in turn causes the delay timer circuit 229 to disconnect the compared output signal from the switching logic network 228 to deactivate relay 230 so that the motor 61 is stopped. The speed at which the control motor 61 changes the output speed of the variable speed drive 56 is such that the time lag between the change in output speed from the variable speed drive 56 to the corresponding change in speed in the supply pipe 14 is minimized. If the compared signal from the comparator circuit 226 indicates that the pipe speed is greater than that indicated by the reference signal from the input circuit 206, then, after the appropriate time delay by the delay timer circuit 229, the switching logic network 228 activates a decrease relay 231 to operate the motor 61 through limit switch LS4 to decrease the speed of movement of the pipe 14. The limit switch LS4 is arranged to be opened in the event the variable speed drive 56 reaches its minimum speed setting. Typically, the flow control valve 49 is adjusted so that the desired speed of travel of pipe 14 can be maintained without switches LS3 or LS4 being opened.

The signal conditioning circuit 211 also produces an output to a disable timer circuit 232 which serves to affect shutdown of the system in the event the motion of the supply pipe 14 is stopped during a run or at the end of a run when the carriage unit 12 moves up against the reel unit 22. The disable timer circuit 232 has a timing cycle of short duration, usually one-half second, so that the shutdown sequence is initiated as soon as the signal from the tachometer assembly 176 is lost. As long as the disable timer circuit 232 receives a signal from the tachometer assembly 176 to keep the disable timer circuit 232 from timing out, the disable timer circuit 232 generates an output signal to an enable timer circuit 234 set for a longer timing cycle, usually 30-45 seconds. When the enable timer circuit 234 receives a signal from disable timer circuit 232 for a period of time exceeding the timing period of circuit 234, it generates an enabling signal to the switching logic network 228 that enables it to operate relays 230 and 231 to effect speed control. This serves to initially delay speed adjustment until the output of tachometer assembly 176 has stabilized. Once network 228 has been enabled by the enable timer circuit 234, it remains enabled as long as circuit 234 receives a signal from the disable timer circuit 232. As soon as the enable timer circuit 234 times out, it produces a signal to enable gate 235 to affect shutdown as will become more apparent.

It will be appreciated that the disable timer circuit 232 receives a signal from tachometer assembly 176 through circuit 211 as long as the pipe 14 is moving. Movement of pipe 14 will stop if there is a breakdown in the drive unit 45 or when the carriage unit 12 reaches the end of its run so that the gate engaging member 171 thereon forces the gate 95 to its partly closed position shown by dashed lines in FIG. 9 to open valve 49. In either event, the loss of the signal to disable timer circuit 232 allows it to time out.

As soon as circuit 232 times out, the signal to the enable timer circuit 234 terminates to cause the switching logic network 228 to be disabled and the signal to enable gate 235 to be generated. At the same time, enable timer circuit 234 generates a signal to the start/stop timer circuit 201 to retrigger its timing cycle.

When the start/stop timer circuit 204 initially timed out, it generated a signal to the start latch 209 to latch it. This caused the start latch 209 to generate an output signal which was transmitted to the enable gate 235 to hold it in a transmitting condition. Thus, when timer circtit 234 generates the signal to gate 235, this signal is transmitted through the gate 235 to stop latch 236 to latch it. When stop latch 236 is latched, it energizes stop control relay 238 appropriately connected to the control motor 105 on positioner 100 through limit switch LS1 to cause the control motor 105 to rotate in the appropriate direction to retract the drive member 102 and pivot the control gate 95 back to its fully closed position as seen in FIG. 8. When control gate 95 reaches its fully closed position, limit switch LS1 is opened to stop motor 105. This serves to lift the tachometer assembly 176 out of contact with the pipe 14.

The water continues to be discharged from the carriage unit 12 until the start/stop timer circuit 204 times out so that the same water coverage will be distributed about carriage unit 12 when it stops as during the rest of the run.

At this time, the water being supplied to the system from the pressurized source needs to be turned off to prevent over-watering. To automatically perform this function, a shutdown latch 239 is provided. An output of the stop latch 236 is connected to an enable gate 240 so that gate 240 is held in a transmitting state as soon as stop latch 236 is latched. When the start/stop timer circuit 204 times out, it generates an output which is transmitted through gate 240 to the shutdown latch 239 to latch it. When latch 239 is latched, it generates a shutdown signal which is used to turn off the water being supplied to the system.

The shutdown signal is illustrated as activating a transmitter 241 which transmits a radio/frequency signal to a remote receiver 242 located at the water source. When the receiver 242 receives the signal from transmitter 241, it operates a water supply controller 244 to shut off the water. Where the water source is a field located hydrant, the controller 244 may operate a cutoff valve at the hydrant. Where the water source is a remotely located pumping unit, the controller 244 may operate to turn off this unit. Another portable receiver may be supplied to the operator to notify him when the water is shut off to signal that it is time to relocate the system.

While the circuit discloses the use of an RF transmitter and receiver to interconnect the control circuit 176 and the water supply controller 244, it is to be understood that different arrangements could be used for this purpose. For instance, where the water supply controller 244 is located close to the reel unit 11, the controller 244 could be hard wired to the shutdown latch 239. Likewise, sonic or light transmitter-receiver arrangements could be used.

To allow manual operation of the system, a manual start circuit 245 is provided to operate start latch 209 and a manual stop circuit 246 is provided to operate stop latch 236. A manual speed control circuit 248 is provided to operate the switching logic network 228 to allow the speed of movement of pipe 14 to be manually increased and decreased.

In operation, the operator transports the reel unit 11 with the carriage unit 12 on the lift/anchor assembly 120 to the beginning of the run that the carriage unit is to make. After lowering the carriage unit 12 and anchoring it in place with pin 192, the operator releases the belt tensioner 69 with control rod 70 so that reel 22 is free to rotate. The reel unit 11 is then towed to the end of the run over the track the carriage unit 12 is to make to lay out the supply pipe 14. The operator then lowers the lift/anchor assembly 120 onto the ground so that the angles 125 engage the ground to hold the reel unit in position. The control rod 70 is manipulated to reconnect the drive unit 45 to the reel 22.

After the operator dials in the desired rate of travel of carriage unit 12 with the input switches 208 on the control unit 175, the flexible feed hose 42 is connected to the water source. The water source is turned on to supply water under pressure to the manifold pipe 40. As soon as the water pressure in pipe 40 builds sufficiently to close the pressure switch 52, the control unit 175 operates the reel unit 11 to tow the carriage unit 12 to the reel unit 11 at the desired speed to effect uniform irrigation over the entire run of carriage unit 12. At the end of the run, the control unit 175 automatically shuts off the water supply and notifies the operator.

What is claimed as invention is:

1. A reel type irrigation system adapted to be connected to a source of liquid under pressure to distribute the liquid on the ground comprising:

a reel unit including a support frame, a reel rotatably mounted on said support frame, and drive means mounted on said support frame and adapted to drivingly rotate said reel in a given direction when said drive means is connected to the source of liquid under pressure;

a carriage unit including support means movably supporting said carriage unit on the ground and a sprinkling gun mounted thereon adapted to discharge the liquid therefrom onto the ground when said sprinkling gun is connected to the source of liquid under pressure;

a flexible pipe connected at one end to said reel and at the other end to said support means and said sprinkling gun on said carriage unit so that said pipe is wound around said reel as said reel is rotated to pull said carriage unit over the ground as said pipe is wound around said reel;

tachometer means for detecting the actual rate of movement of said flexible pipe toward said reel unit and thus the rate of movement of said carriage unit, said tachometer means generating an output signal indicative of the actual rate of movement of the carriage unit toward said reel unit; and display means operatively connected to said tachometer means and responsive to said output signal for visually displaying the actual rate of movement of said flexible pipe and thus said carriage unit toward said reel unit.

2. A reel type irrigation system adapted to be connected to a source of liquid under pressure to distribute the liquid on the ground comprising:

a reel unit including a support frame, a reel rotatably mounted on said support frame, and drive means mounted on said support frame and adapted to drivingly rotate said reel in a given direction when said drive means is connected to the source of liquid under pressure;

a carriage unit including support means movably supporting said carriage unit on the ground and a sprinkling gun mounted thereon adapted to discharge the liquid therefrom onto the ground when said sprinkling gun is connected to the source of liquid under pressure;

a flexible supply pipe connected at one end to said reel and at the other end to said support means and said sprinkling gun on said carriage unit so that said pipe is wound around said reel as said reel is rotated to pull said carriage unit over the ground toward said reel unit while supplying liquid to said sprinkling gun;

tachometer means for detecting the actual rate of movement of said flexible pipe toward said reel unit and thus the rate of movement of said carriage unit, said tachometer means generating an output signal indicative of actual rate of movement of said carriage unit toward said reel unit;

reference signal generating means for generating a reference signal corresponding to said output signal from said tachometer means when the actual rate of movement of said carriage unit toward said reel unit is at a prescribed rate;

comparator means for comparing said output signal from said tachometer means and said reference signal from said reference signal means and generating a compared signal output representative of the difference between said output signal and said reference signal; and speed adjustment means operatively connected to said drive means for adjusting said drive means in response to the said compared signal output from said comparator means until said output signal from said tachometer means matches said reference signal from said reference signal means to maintain the actual rate of movement of said carriage unit toward said reel unit at said prescribed rate.

3. The irragation system of claim 2 further including signal adjustment means operatively connecting said tachometer means and said comparator means to adjust said output signal from said tachometer means to the mean value of said output signal over prescribed short periods of time to produce a mean value signal indicative of the mean rates of movement of said carriage unit to said reel unit over said prescribed short periods of time and supplying said means value signal to said comparator means for comparison with said reference signal.

4. The irrigation system of claim 3 further including first time delay means operatively connecting said comparator means and said speed adjustment means to prevent actuation of said speed adjustment means until said compared signal output from said comparator means indicates that the mean actual rate of movement of said carriage unit toward said reel unit is different from said reference signal for a time period exceeding a first prescribed period of time.

5. The irrigation system of claim 4 further including shutdown means for shutting off the water from said source of liquid to said supply pipe after said carriage unit reaches said reel unit.

6. The irrigation system of claim 4 further including second time delay means for delaying operation of said drive means until liquid is supplied to said supply pipe for a second prescribed period of time to affect the same irrigation rate at the beginning of the run of the carriage unit toward the reel unit as during the run in which the carriage unit is moving toward said reel unit.

7. The irrigation system of claim 5 further including second time delay means for preventing operation of said drive means for a second prescribed period of time after liquid is supplied to said supply pipe to affect the same irrigation rate at the beginning of a run of the carriage unit toward the reel unit as during the movement of the carriage unit toward the reel unit and for delaying activation of said shutdown means after said carriage unit reaches said reel unit at the end of a run for said second prescribed period of time to affect the same irrigation rate at the end of the run as during the run in which the carriage unit is moving toward the reel unit.

8. The irrigation system of claim 2 wherein said reference signal generating means is adjustable to change the value of said reference signal whereby the prescribed rate at which said carriage unit is moved toward said reel unit is changed.

9. The irrigation system of claim 6 wherein said reference signal generating means is adjustable to change the value of said reference signal and thus change the speed of movement of said carriage unit toward said reel unit, said reference signal generating means further connected to said second time delay means to adjust said second prescribed time period in response to changes in said reference signal to maintain the irrigation rate at the beginning of a run of the carriage unit toward said reel unit at the same rate as maintained during movement of said carriage unit toward said reel unit.

10. The irrigation system of claim 2 wherein said support means of said carriage unit further includes a front axle assembly, a first pair of pneumatic tires rotatably mounted on said front axle assembly, a rear axle assembly, a second pair of pneumatic tires rotatably mounted on said rear axle assembly, connecting means interconnecting said front and rear axle assembly so that said rear axle assembly can pivot with respect to said front axle assembly about a substantially vertical axis so that said carriage unit can track along a curved path conforming to the path along which said supply pipe extends between said carriage unit and said reel unit and so that said real axle assembly can pivot with respect to said front axle assembly about a horizontal axis so that said carriage unit can conform to uneven terrain, and positioning means normally urging said front and rear axle assemblies toward a position parallel to each other.

11. The irrigation system of claim 2 wherein said reel unit further includes a lift/anchor assembly mounted on said support frame, said lift/anchor assembly including a pair of lift arms pivotally mounted on said support frame, ground engaging means mounted on said lift arms for selectively engaging the ground and anchoring said reel unit with respect to the ground when said lift arms are lowered, and carriage engaging means on said lift arms for selectively engaging said carriage unit when said carriage unit is adjacent said reel unit at the end of a run to lift said carriage unit off the ground when said lift arms are raised.

12. The irrigation system of claim 2 wherein said reel includes a pair of spaced apart peripheral sections thereon and wherein said drive means includes differential means operatively driving a pair of spaced apart drive members and connection means operatively connecting each of said drive members to one of said peripheral sections of said reel so that differential means applies equal driving forces to said peripheral sections to drivingly rotate said reel.

13. The irrigation system of claim 2 further including pressure responsive means for activating said drive means in response to a prescribed pressure being reached in said supply pipe to cause said drive means to rotate said reel.

14. A reel type irrigation system adapted to be connected to a source of liquid under pressure to distribute the liquid on the ground comprising:
   a reel unit including a support frame, a reel rotatably mounted on said support frame, and drive means mounted on said support frame and adapted to drivingly rotate said reel in a given direction when said drive means is connected to the source of liquid under pressure;
   a carriage unit including support means movably supporting said carriage unit on the ground and a sprinkling gun mounted thereon adapted to discharge the liquid therefrom onto the ground when said sprinkling gun is connected to the source of liquid under pressure; and
   a flexible supply pipe connected at one end to said reel and at the other end to said support means and said sprinkling gun on said carriage unit so that said pipe is wound around said reel as said reel is rotated to pull said carriage unit over the ground toward said reel unit while supplying liquid to said sprinkling gun,
   said carriage unit further including a coupling connected to said other end of said supply pipe, mounting means movably connecting said coupling to said support means so that the towing force exerted on said carriage unit by said supply pipe is transmitted from said coupling to said support means by said mounting means, and a flexible hose operatively connecting said coupling with said sprinkling gun to supply liquid from said supply pipe to said sprinkling gun while allowing relative vertical movement of said coupling with respect to the ground.

15. The irrigation system of claim 1 further including signal conditioning means connecting said tachometer means and said display means to generate a mean value output signal which is the mean value of the output signal from said tachometer means over prescribed short periods of time and to supply the mean value output signal to said display means to cause said display means to visually display the mean actual rate of movement of said flexible pipe and thus said carriage unit toward said reel unit.

16. The irrigation system of claim 2 wherein said drive means includes a liquid turbine having an output shaft driven when the liquid under pressure is supplied to said turbine; a driver having an input shaft and operatively connected to said reel for rotating said reel when said input shaft is rotated; and a variable speed drive connecting said output shaft of said turbine with said input shaft of said driver, said speed adjustment means connected to said variable speed drive to cause said variable speed drive to selectively change the rotational speed of said input shaft relative to the rotational speed of said output shaft to keep the rate of movement of said carriage unit at said prescribed rate.

* * * * *